United States Patent [19]
Lenoir et al.

[11] 3,844,872
[45] Oct. 29, 1974

[54] HEAT SEALING APPARATUS

[75] Inventors: Francis X. Lenoir, New Castle;
Bruce E. Metz; Ashley A. Brooks,
both of Wilmington, all of Del.;
William J. Hill, Landenburg, Pa.

[73] Assignee: Hercules Incorporated, Wilmington, Del.

[22] Filed: Jan. 8, 1973

[21] Appl. No.: 321,687

[52] U.S. Cl.................. 156/498, 156/583, 53/379, 53/388
[51] Int. Cl...................... B32b 31/00, B65b 51/00
[58] Field of Search...... 156/582, 583, 498; 53/373, 53/375, 379, 388

[56] References Cited
UNITED STATES PATENTS

| | | | |
|---|---|---|---|
| 1,066,193 | 7/1913 | Ferguson | 53/388 |
| 2,016,627 | 10/1935 | Conti et al. | 53/388 |
| 2,978,007 | 4/1961 | Jensen | 53/388 |
| 3,064,403 | 11/1962 | Tokos et al. | 53/379 |
| 3,166,462 | 1/1965 | Schoder | 156/582 |

*Primary Examiner*—Douglas J. Drummond
*Attorney, Agent, or Firm*—Tipton D. Jennings

[57] ABSTRACT

The embodiment of the heat sealing apparatus which is disclosed can be used to heat seal the long seams of film-wrapped cigarette packs. It includes a heated drum having a low-friction coating on the surface thereof. The drum is rotated, and as the packs are carried past the drum, spring means urge these packs into contact with the heated drum surface to effect sealing of these long seams. The curvature of the drum is selected essentially to match the concavity caused by the inward flexing of the seam so that the seam is kept under continuous pressure during the transfer of heat by the drum surface.

12 Claims, 8 Drawing Figures

DIRECTION OF TRAVEL THROUGH FLOWPATH 70

3,844,872

HEAT SEALING APPARATUS

BACKGROUND OF THE INVENTION

The present invention relates to apparatus for sealing film wrapping materials by the application of pressure and heat. More particularly, this invention relates to heal sealing apparatus used to seal the seams of wrappers for flexible articles, such as cigarette packages and the like.

Heat sealing is a well known technique to effect closure of film wrapping material upon packages. Automatic packaging machinery which incorporates heat sealing apparatus generally employs one of two direct-contact heat-transfer techniques. In one of the techniques, the seam which is to be sealed is held in contact with and moved past a flat heated stationary surface. In the other technique, there is no relative movement between the seam and heated surface during direct contact heat transfer. Instead, the movement of the package is interrupted, and a reciprocating heated platen moves against the package while at rest and seals the film seam.

It has been discovered that the use of these conventional heat sealing techniques can result in a lower quality seal, as well as one having undesirable appearance. For example, when pressure is applied by a heated platen to a flexible package, the package will often flex away from the point of pressure application, resulting in a lower heat transfer than desired. Furthermore, the temperature of the platen or other type of heating apparatus presently in use can drop when it first makes contact with the package, again resulting in a lower heat transfer. The net effect is that the seal is often found to be incomplete or weak. Should the seam become opened inadvertently during subsequent handling of the package, the contents of the package are now exposed to the atmosphere. Furthermore, where the seam is sealed by sliding past a stationary heater, the leading edge of the seam can be wiped or pushed back along the package so that the resulting seal is crumpled and accordingly unsightly.

The above problems have been found to occur particularly in the wrapping of flexible or soft cigarette packages. The cigarettes are arranged within the package in a staggered fashion such that no cigarette abuts the inside surface of the package at the line along which the longitudinal film seam is to be placed. The flexible wrapper, therefore, can flex inwardly under application of external pressure by a heated platen in the making of the longitudinal seam on the transparent outer film. Should an incomplete or weak seal result at this seam, the shelf-life of the cigarette package may be markedly reduced.

SUMMARY OF THE INVENTION

The heat sealing apparatus of the present invention overcomes the aforesaid problems of the prior art by providing sufficient heat transfer during the sealing procedure to obtain a film seal which is continuous, uniform, and of an improved strength, and which has an improved appearance as well.

In accordance with the purposes of the invention, as embodied and broadly described herein, there is comprised apparatus for sealing overlapped portions of a heat-sealable film wrapper to form a heat-sealed seam which includes a platen having a substantially cylindrical surface, means for rotating said platen about its longitudinal axis, a guide spaced from said platen to form a flow path past such platen, said flow path being substantially parallel to the longitudinal axis of the platen and designed for packages having wrappers to be sealed such that the film wrapper will make contact at its overlapped portions with the cylindrical surface of said platen, means for moving individual packages along said flow path, and means for heating the cylindrical surface of said platen whereby said platen can transfer heat to said film wrapper to form a heat-sealed seam along said overlapped portions.

Preferably, there are means mounted on the guide for urging packages into contact with the cylindrical surface of the platen during movement of the packages along said flow path. It is also preferred that the urging means includes a plurality of leaf springs continuously disposed along the guide, the flexibility of the springs serving further to accommodate packages of irregular shape in the flow path.

It is also preferred that the heating means includes a plurality of elongated heaters disposed within the interior of said platen, the heaters being designed to convey heat to the cylindrical surface of the platen. It is further preferred that a second platen be provided which is formed adjacent to and rotatable with the first platen, this second platen also having a substantially cylindrical surface which is designed to be contacted by the overlapped portions of the film wrapper subsequent to the formation of said heat-sealed seam, said second platen serving as a heat sink to cool and thereby set said heat-sealed seam.

The invention consists in the novel apparatus, constructions, arrangements, combinations, and improvements shown and described. The unique features and advantages of the invention will become apparent by reading the following description which, taken in conjunction with the accompanying drawings which are incorporated in and constitute a part of this specification, disclose a preferred embodiment thereof.

DESCRIPTION OF THE PREFERRED EMBODIMENT

Figure 1:
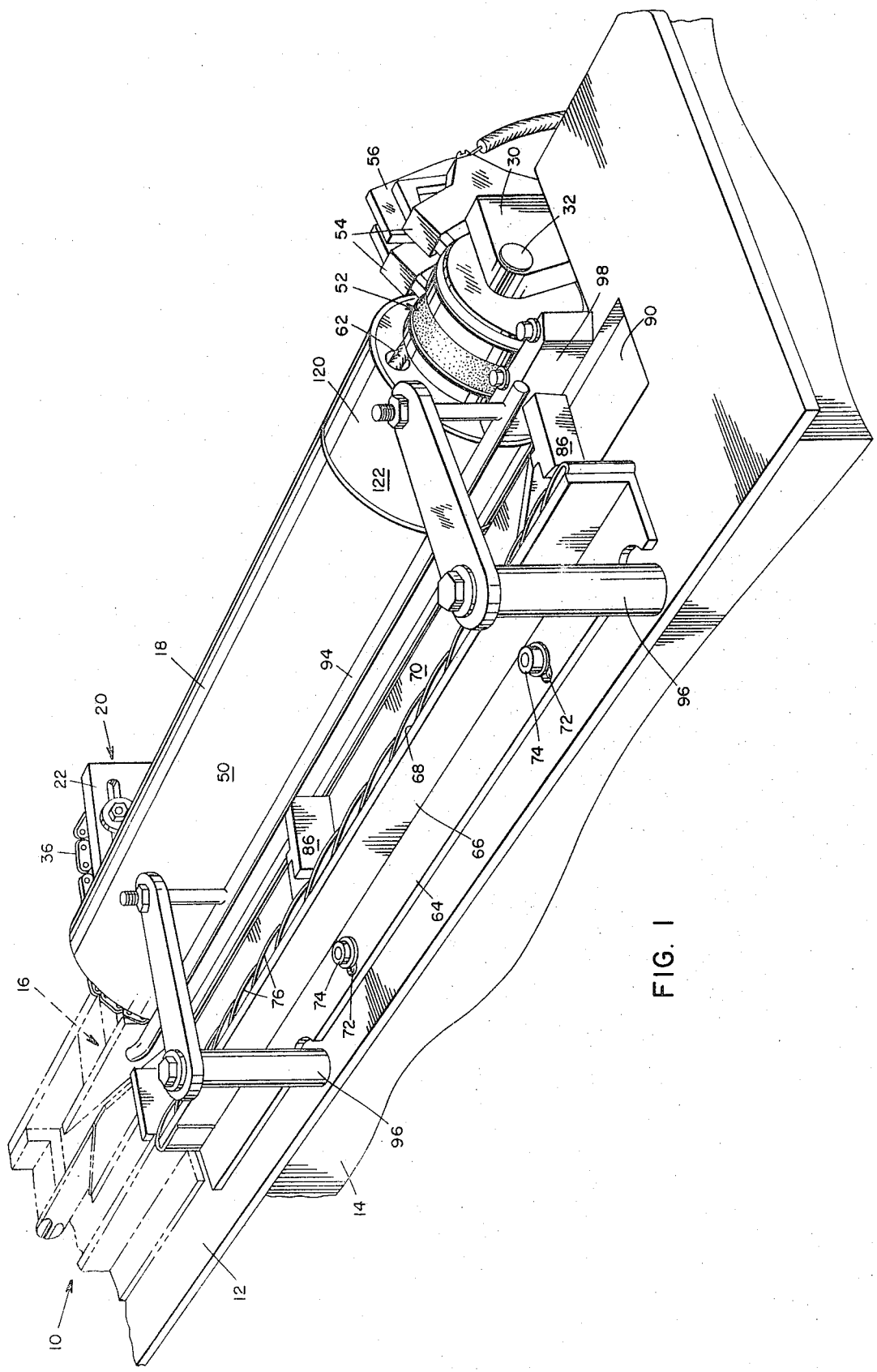
FIG. 1 is a perspective view of an improved heat sealing apparatus constructed to embody the concepts of the present invention.

Reference will now be made in detail to the present preferred embodiment of the invention, an example of which is illustrated in the accompanying drawings.

Referring now to the drawings, it should be understood that the sealing apparatus of the present invention can be constructed as a separate device, or, preferably, formed as part of a wrapping and sealing machine which automatically feeds and applies wrapper webs to packages or other articles, folds the wrapper about the package, and heat seals the seams. To facilitate the description of the present invention, particular reference will be made to a machine for wrapping flexible or soft cigarette packages with a transparent heat-sealable film, such as polypropylene film or cellophane, by way of example. For ease of illustration, it will be assumed that the sealing apparatus of the present invention performs the final sealing step along the longitudinal seam prior to ejection of the cigarette pack from the machine. The present sealing apparatus can thus utilize the drive and other mechanisms of the overall wrapping and sealing machine by conventional gearing arrangements and attachments used in machines of this type.

Figure 2:
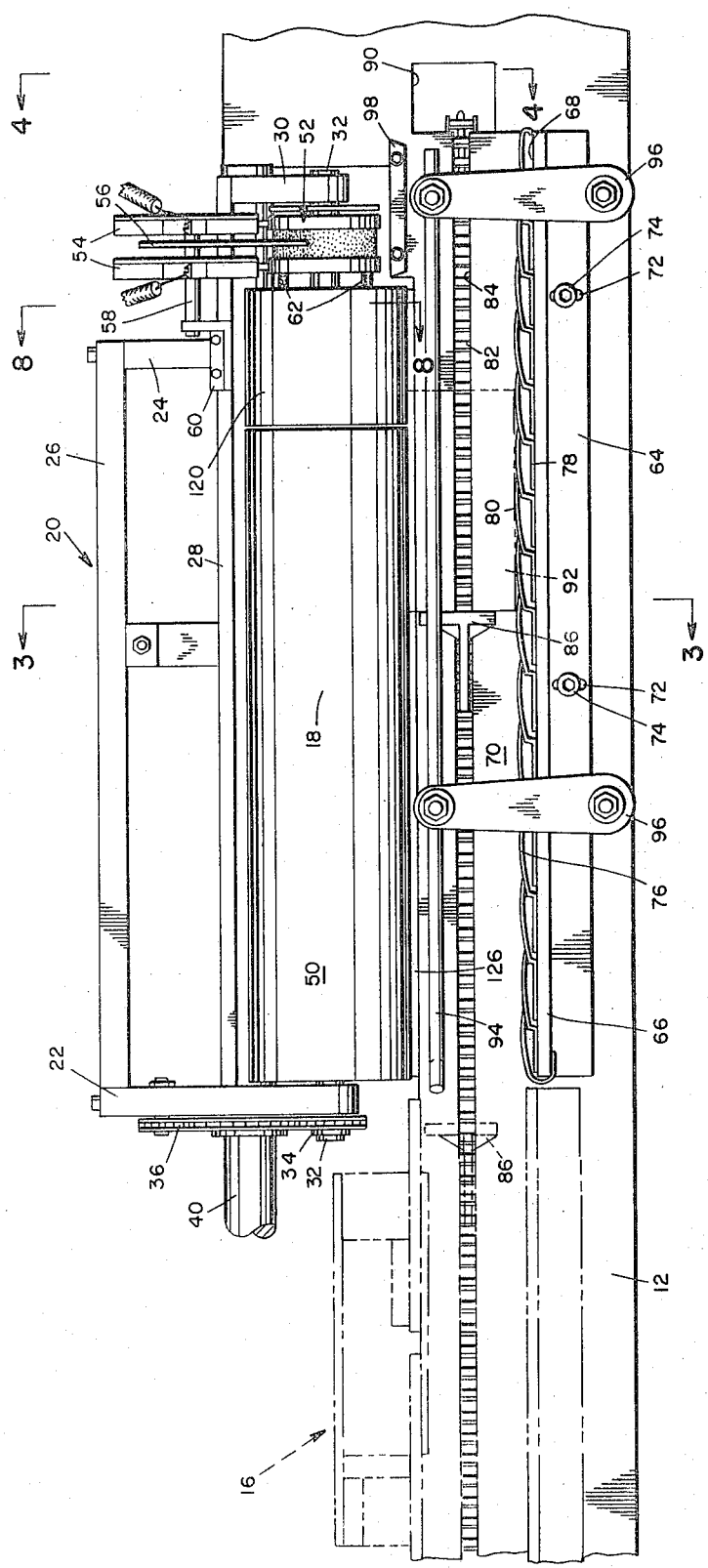
FIG. 2 is a top plan view thereof.

With particular reference to FIGS. 1 and 2, the wrapping and sealing machine, of which the present sealing apparatus forms a part, is represented generally by numeral 10. This machine includes a bed plate 12 mounted on a steel frame 14, the latter providing a rigid foundation for the various folding and sealing apparatus positioned at the several stations along bed plate 12. One of these stations includes conventional apparatus 16, depicted in phantom outline, for tucking and folding the longitudinal or long seam along one side of a cigarette pack in preparation for the heat sealing of this seam. This folding results in there being overlapped portions of the heat-sealable film wrapper along the length of this long seam so that these portions become sealed to each other by the subsequent application of heat and pressure.

In accordance with the invention, the sealing apparatus includes a platen having a substantially cylindrical surface. With additional reference to the cross-sectional view of FIG. 3, taken along line 3—3 of FIG. 2, this platen is here embodied as a cylindrical drum 18 positioned adjacent to bed plate 12 with its longitudinal axis parallel thereto. The drum 18 is preferably mounted in a yoke assembly 20, and with additional reference also to the partial side elevation of FIG. 4, this assembly is seen as comprising two end brackets 22 and 24 connected to rear and forward support bars 26 and 28, respectively. Support bar 28 is of a greater length than support bar 26 and extends past end bracket 24. At this extended end of forward support bar 28, a third end bracket 30 is mounted thereon.

Figure 5:
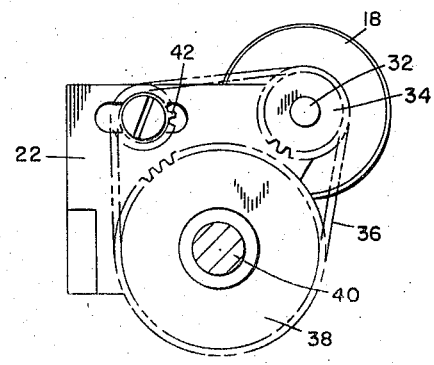
FIG. 5 is a detailed side elevation of the rotational means for the heated cylindrical drum.

In accordance with the invention, means are provided for rotating the platen about its longitudinal axis. As here embodied, the rotating means includes a drum shaft 32, on which drum 18 is mounted for rotation therewith, and which is journaled for rotation in end brackets 22 and 30. Drum 18 can be retained on shaft 32 by set screws (not shown) or other suitable means. With further reference to FIG. 5, which shows a detailed side elevation of end bracket 22, the drum shaft 32 preferably has a sprocket 34 mounted thereon. This sprocket and thereby the shaft 32 are rotated by a drive chain 36 connected to a drive sprocket 38. Sprocket 38 is mounted onto a main drive shaft 40 which is rotated by a drive means (not shown) incorporated into the wrapping and sealing machine 10. Chain 36 also passes over an idler sprocket 42 mounted onto end bracket 22. The position of idler sprocket 42 can be varied to adjust the tension of the chain 36 in a well known manner. The drive shaft 40 is supported by end brackets 22 and 24 and is suitably journaled therein to permit rotation. The drum 18 is preferably rotated about its longitudinal axis at a substantially constant angular velocity. Rotational speeds of approximately 150–180 rpm have been found to be satisfactory for the heat sealing process, but it is to be understood that this range of speeds is by way of example and is not to be construed as limiting the present invention.

The yoke assembly 20 is preferably mounted onto an air-actuated spring such as depicted at 44 which when actuated causes the yoke assembly 20 to pivot slightly about drive shaft 40 and thereby tilt drum 18 back from bed plate 12. This affords additional space to clear a cigarette package that might become jammed in the machinery during operation or otherwise permit additional space for access to the several parts of the apparatus.

Figure 3:
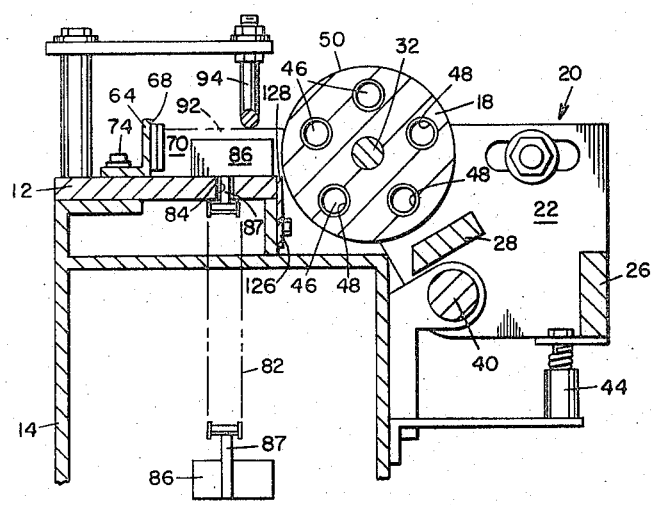
FIG. 3 is a side elevation, in section, of the apparatus taken along line 3—3 of FIG. 2.
Figure 4:
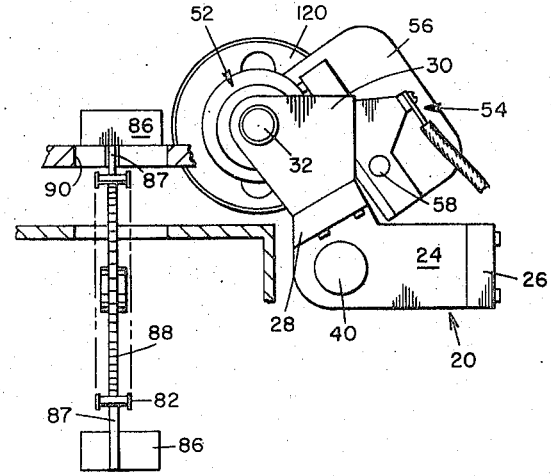
FIG. 4 is a partial side elevation, in section, taken along line 4—4 of FIG. 2.

In accordance with the invention, means are provided for heating the cylindrical surface of the platen so that the platen can transfer heat to the film wrapper to form a heat-sealed seam along the overlapped portions of the film. As here embodied, the heating means includes a plurality of heaters 46 disposed within the interior of the drum. Preferably, the heaters 46 are of the elongated cartridge type and reside within wells 48 bored essentially throughout the entire length of drum 18 parallel to drum shaft 32. In FIG. 3, the heaters are shown as being five in number, although a greater or lesser number can be used provided sufficient heat is conveyed to the cylindrical surface 50 of the drum to accomplish the required heat sealing. If precise temperature control is required, or desired, one of the heaters 46 can be replaced with a conventional temperature sensor which controls the application of current to the heaters and thereby their temperature in a well known manner.

Preferably, the drum 18 is made of a lightweight material as, for example, aluminum bar stock cut to the desired length. The wells 48 can be suitable formed, as by drilling into the aluminum bar. The center hole which receives the drum shaft 32 can be formed in the same manner. The drum surface 50 is preferably coated with a durable low-friction material, such as a ceramic, although it is obvious that other types of materials can be used. It is preferred, however, that the material which is selected has high wear characteristics to endure the temperature and pressures required in the heat sealing operation.

Mounted on the drum shaft 32 for rotation therewith is a slip ring assembly 52 having a pair of slip rings of conventional construction for providing a conducting path for the application of current to the heaters 46. A pair of brushes 54 ride on these rings in the usual manner in order to provide continuous electrical contact. A brush insulator 56 is positioned between the brushes 54. The brushes 54 and insulator 56 are mounted on pin 58 which, in turn, is attached to bracket 60. Bracket 60 is mounted by suitable means onto forward support bar 28. Electrical wiring 62 is connected between the slip rings 52 and the heaters 46 in drum 18 in accordance with standard wiring practices.

In accordance with the invention, a guide is spaced from the platen to form a flow path past said platen for packages having wrappers to be sealed such that the film wrapper will make contact at its overlapped portions with the cylindrical surface of the platen. As here embodied, an elongated guide bracket 64 is mounted onto the top of bed plate 12. Guide bracket 64 is preferably of an L-shaped construction having an upright leg 66. The spacing between the inside face 68 of bracket 64 and the cylindrical surface 50 of drum 18 defines a flow path 70 along the top of bed plate 12 for the passage of cigarette packages past drum 18. As can be evidenced from the drawings, this flow path 70 is formed substantially parallel to the longitudinal axis of the platen or drum 18.

Preferably, means are provided to adjust the lateral spacing of the guide with respect to the platen, thereby to vary the width of the flow path to accommodate packages of varying sizes. As here embodied, guide bracket 64 is provided with a plurality of elongated holes 72 through which the mounting screws 74 pass to mount the guide bracket 64 to bed plate 12. The lateral adjustment of bracket 64 is accomplished by loosening screws 74 and moving guide bracket 64 toward or away from drum 18, as desired. Thus, if the width of the packages of cigarettes which are to be heat sealed are of a greater or lesser width than the cigarette packages which were sealed the last time the sealing apparatus was utilized, the width of the flow path can be readily changed.

In accordance with the invention, means are mounted on the guide 64 for urging packages into contact with the cylindrical surface of the platen during movement of the packages along the flow path 70. As here embodied, the urging means includes a plurality of leaf springs 76 continuously disposed along the inside face 68 of guide bracket 64. Preferably, each leaf spring 76 is formed, as best seen in FIG. 2, such that one end 78 is attached to face 68, and the other end 80 is bent or curved outwardly so that it overlaps the next adjacent spring 76. Each spring 76 can be attached to face 68 by cementing, riveting, or other suitable means.

The overlapping construction of these leaf springs 76, in addition to urging the packages into contact with drum 18, makes them sufficiently flexible to accommodate cigarette packages of an irregular shape. Because these packages are being formed by mechanical means, it often occurs that the sides of the packages are not parallel, resulting in one end of the pack being larger than the other. However, the leaf springs can accommodate these slight variations in size as the packages move down the flow path 70. In this manner, the leaf springs 76 prevent undue pressure against the drum 18 by the cigarette pack which might otherwise occur, and the likelihood of the pack binding against drum 18 or having the wrapping film become damaged is much less.

Preferably, the leaf springs 76 are formed of thin, flat strips of steel, phosphor-bronze, or other suitable material, and are bent to obtain the zig-zag pattern shown in FIG. 2. The springs are then individually connected to the inside face 68 of the guide bracket 64.

In accordance with the invention, there are means provided for moving individual packages of cigarettes along said flow path 70. As here embodied, the moving means includes an endless chain 82 which travels in a direction parallel to flow path 70 but beneath bed plate 12. A slot 84 is formed in the bed plate above the chain 82. A plurality of pushers 86 are connected to chain 82 by legs 87, each of which extends through slot 84 to allow each pusher 86 to travel down the flow path during movement of the chain. A sprocket 88 is diagrammatically pictured in FIG. 4 and is positioned adjacent the end flow path 70 to return the pushers 86 back to the opposite end of bed plate 12. The opening 90 is provided in bed plate 12 for the pushers to drop through and return to the opposite end of the bed plate. A conventional drive source (not shown) is utilized to rotate sprocket 88. The endless chain 82, pushers 86, and sprocket 88 are of a well known construction. A cigarette package 92 is depicted in phantom outline in FIGS. 2 and 3 to illustrate how the pushers 86 are adapted to contact the cigarette packs from behind to push the packs along the flow path 70.

To prevent the cigarette packs from rising as they move along the flow path 70, an elongated hold-down rod 94 is positioned above the flow path 70. The spacing between the bottom of the rod 94 and the top of bed plate 12 is preferably adjusted to be just slightly greater than the thickness of the cigarette packs whose wrappers are being heat sealed. The hold-down rods are connected to and positioned by a pair of hold-down brackets 96 attached to bed plate 12. A short guide rail 98 is also connected to bed plate 12 at the end of the flow path 70 to prevent the lateral displacement of the cigarette packages against the slip ring assembly 52.

Figure 6:
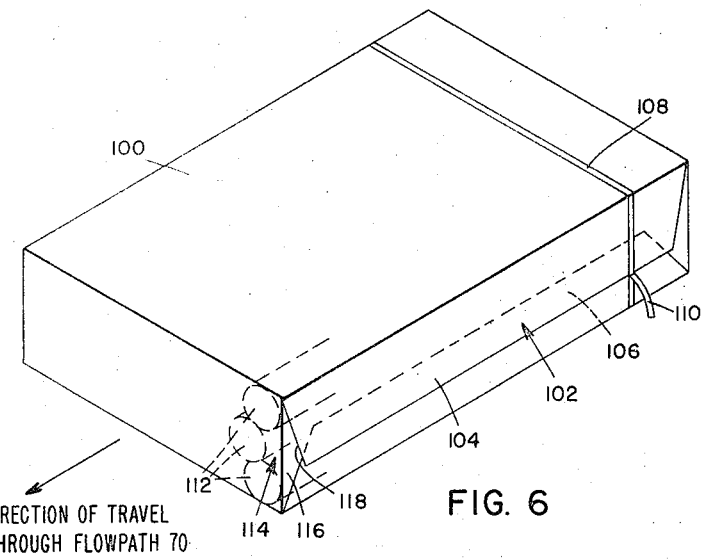
FIG. 6 is a perspective view of a typical cigarette package whose longitudinal seam is to be sealed.

Prior to describing the operation of the heat sealing apparatus of the present invention, reference is invited to FIG. 6 which depicts in perspective a view of a typical cigarette package 100 whose long seam is to be sealed. Upon leaving the tucking and folding apparatus 16, the long seam 102 is unsealed. One portion 104 of the film overlaps a second portion 106 of the film substantially in the manner shown. At the upper end of the cigarette pack 100, the wrapper includes a conventional tear tape 108 and a tear tape tab 110 which is designed to be gripped and pulled to remove the tear tape when opening of the pack is desired.

The end of three cigarettes 112 are depicted in phantom outline within pack 100. As can be seen, the cigarettes 112 are arranged in a staggered fashion within the pack in that the top and bottom cigarettes are aligned above one another but the middle cigarette is displaced inwardly from the side. This results in a space 114 along the length of the pack between the middle cigarette and the side 116. The location of this space is therefore behind the line where the long seam is to be heat sealed. The side 116 of the pack therefore is not refrained from flexing inwardly into the space 114 under applied pressure.

To begin operation, the drum 18 is caused to rotate by rotation of the main drive shaft 40 and the chain drive connection to drum shaft 32. The drum surface 50 is also brought up to operating temperature by application of power to the heaters 46. Endless chain 82 is also caused to move, thereby causing pushers 86 to travel down the flow path 70. As each pack of cigarettes is carried from the tucking and folding station 16 by a pusher 86, it moves continuously down flow path 70. Leaf springs 76 urge each cigarette package against drum 18 so that heat is applied to the long seam 102 under pressure. Heat sealing of this long seam occurs during its continuous contact with drum 18 as it travels the length thereof. When the cigarette pack leaves drum 18, it is carried by the pushers 86 past the hole 90 where it can be collected from the top of bed plate 12 for further packaging.

Figure 7:
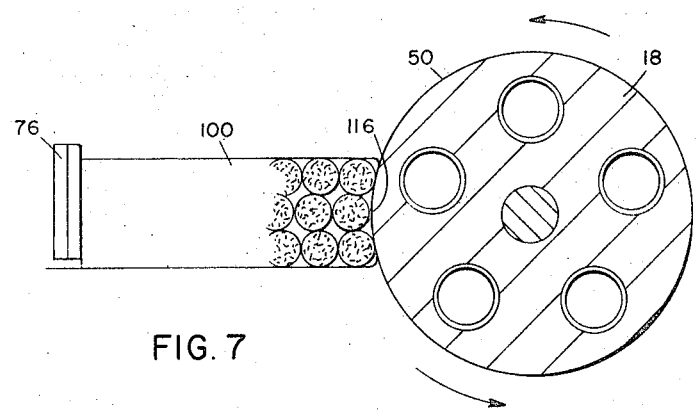
FIG. 7 is an enlarged diagrammatic end view of the relationship of the drum, leaf spring, and cigarette package during the heat-sealing operation.

With reference to FIG. 7, a better understanding of the effect of the curved surface of drum 18 can be understood. FIG. 7 shows an enlarged diagrammatic view of the drum 18, cigarette package 100, and leaf springs 76 which urge the long seam of pack 100 into contact with drum 18. As has been stated previously, the longitudinal axis of drum 18 is substantially parallel to the flow path 70 along which the cigarette packs move. The vertical position of drum 18 is such that the side 116 of a pack 100 is tangent to the surface of drum 18. The drum diameter is selected so that the curvature of the drum surface 50 and the applied pressure of springs 76 causes an inward flexing of side 116 of each cigarette pack, yet without loss of the substantially complete contact of the surface 50 with the longitudinal seam 102.

Thus, the present invention takes advantage of the tendency of a cigarette package 100 to flex inwardly at side 116 by use of a curved platen surface which essentially matches the concavity of the flexed package. In this manner, the long seam 102 is kept under continuous pressure during the transfer of heat by drum surface 50 as the pack travels down flow path 70. Higher sealing pressures can therefore be attained, resulting in an improvement in heat transfer during the heat sealing operation.

Rotation of drum 18 also lends to the capability to apply greater pressure against the seam during heat sealing than can be applied by a stationary platen. The reduced friction encountered via rotation of the drum reduces the tendency of the film to bind against the drum and thus permits the higher pressures to be used.

Drum rotation also eliminates the problem of having the leading edge of the long seam of a cigarette pack pushed or wiped back during heat sealing. Cigarette packs which are folded in the manner shown in FIG. 6 have the leading edge 118 of the long seam exposed. Movement of the pack past a stationary platen can, by virtue of the friction encountered, cause this wiping back to occur. The heated platen then seals the seam and the resulting leading edge is crumpled and not appealing to the purchaser. The rotational contact of the drum 18 used in the present invention overcomes this problem. The rotation of drum 18 (FIG. 7) across the seam of the pack is in the same direction as the direction in which the top flap 104 lies or points, namely, in the embodiment shown, in the downward direction. The speed of the drum should be maintained sufficiently high to insure that the downward wiping contact of the drum is essentially maintained even though the pack is moving through the flow path 70 in a direction transverse to the direction of rotation.

It has been found that for the particular embodiment herein described that a rotational speed in the aforementioned range of 150–180 rpm is sufficiently fast to prevent this undesirable wiping back of the seam from occurring.

The amount of heat which is required to seal long seam 102 is dependent upon the temperature of the drum and the contact time of this seam with the drum, assuming a constant pressure. Thus, the length of the drum has an important bearing on heat transfer. If the drum is made longer, then the seam is in contact for a longer time period and a lower temperature at the drum can be used. Conversely, if the drum is made shorter, then it must operate at a higher temperature to obtain the same quantity of heat transfer. It is preferred, however, that the drum length be selected so that the temperature at which sealing must occur can be kept below that which would tend to degrade or otherwise adversely affect the heat-sealable film. The use of a rotating drum helps to insure that the surface of the drum in contact with the seam is maintained at the desired sealing temperature. Any drop in surface temperature caused by heat transfer to the film is immediately recovered as the surface which was in contact with the film rotates through 360°. Thus, that portion of the drum surface which is just before rotating into contact with the seam is always at the desired sealing temperatures so that the requisite heat transfer is obtained and improved sealing results.

In accordance with the invention, there is included a second platen adjacent to and rotatable with the platen 18. As disclosed herein, this second platen comprises cooling drum 120 which is mounted on drum shaft 32 between drum 18 and the slip ring assembly 52. Drum 120 is retained on shaft 32 by set screws (not shown) or other suitable means. Drum 120 has a substantially cylindrical surface 122 which is designed to be contacted by the overlapped portions of the film wrapper subsequent to the formation of the heat-sealed seam. The surface 122 of drum 120 is preferably concentric with the surface 50 of drum 18 and of equal diameter so that the inwardly flexed seam 102 of each cigarette pack 100 comes into contact with drum surface 122, under the urging of leaf springs 76, as the pack is transported out of contact with drum 18 by pusher 86.

Figure 8:
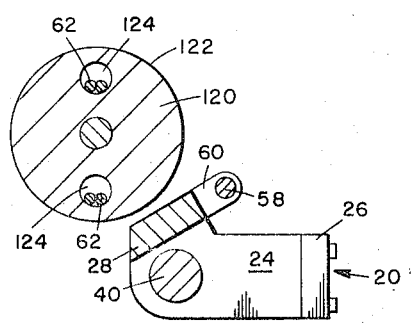
FIG. 8 is a partial side elevation, in section, taken along line 8—8 of FIG. 2.

The interior construction of drum 120 can be best seen from the partial side elevation, in section, of FIG. 8 showing the drum 120 in relation to yoke assembly 20. Preferably, as in the case of drum 18, drum 120 is made of a lightweight material as, for example, aluminum bar stock, cut to the desired length. Holes 124 are bored longitudinally through the aluminum bar and serve as a conduit for heater wiring 62. The center hole for receiving the drum shaft 32 is also formed in drum 120.

The second platen or drum 120 serves as a heat sink to cool and thereby set the heat-sealed seam. This long seam, when it ends contact with drum 18, is at an elevated temperature having just completed the heat-sealing step. If the pack is ejected immediately into further packaging or other handling equipment (not shown) prior to cooling, there is a distinct possibility that the overlapping portions 104 and 106 which form seam 102 could inadvertently separate wholly or partially. However, by causing seam 102 to make intimate contact with the curved surface 122 of drum 120, heat is withdrawn from the seam permitting its temperature to decay to a point where the seam becomes set prior to ejection. The constant rotation of drum 120 permits a cool surface continuously to be presented to the seam 102 of the cigarette pack so that the desired cooling is attained.

To protect the tear tape tab 110 (FIG. 6) from the high temperature of drum 18, a heat shield can be installed between the inside edge of bed plate 12 and the surface of drum 18. As embodied herein, this shield is shown in FIGS. 2 and 3 as a narrow strip 126 of insulation material mounted adjacent to the inside edge of bed plate 12. The cross-sectional showing of FIG. 3 shows a groove 128 formed in the strip, the groove facing away from the drum 18. The tear tape tab 110 rides in groove 128 out of contact with the hot surface of the drum. In this manner, the tear tape tab 110 is kept from being crinkled or seared by the drum surface and the finished appearance of the package is enhanced. The forward end of the strip 126 is preferably formed with a folder (not shown) which forces the tear tape tab to fold under the side of the package and enter the groove 128 as the pack 92 begins its movement past drum 18.

It will now become apparent to those skilled in the art that various modifications and variations can be made in the inventive apparatus described herein without departing from the scope or spirit of the invention.

What is claimed is:

1. Apparatus for sealing overlapped portions of a heat-sealable film wrapper to form a heat-sealed seam comprising a platen having a substantially cylindrical surface, means for rotating said platen about its longitudinal axis, a guide spaced from said platen to form a flow path past said platen, said flow path being substantially parallel to the longitudinal axis of said platen and designed for packages having wrappers to be sealed such that the film wrapper will make contact at its overlapped portions with the cylindrical surface of said platen, means for moving individual packages along said flow path, and means for heating the cylindrical surface of said platen whereby said platen can transfer heat to said film wrapper to form a heat-sealed seam along said overlapped portion.

2. Apparatus as claimed in claim 1 further comprising means mounted on said guide for urging packages into contact with the cylindrical surface of said platen during their movement along said flow path.

3. Apparatus as claimed in claim 2 wherein said urging means comprises a plurality of leaf springs continuously disposed along said guide, the flexibility of said springs serving further to accommodate packages of irregular shape in said flow path.

4. Apparatus as claimed in claim 3 wherein said leaf springs have two ends, one of said ends of each spring being attached to said guide and the other end overlapping the next adjacent spring.

5. Apparatus as claimed in claim 4 further comprising means to adjust the lateral spacing of said guide with respect to said platen thereby to vary the width of said flow path to accommodate packages of varying sizes.

6. Apparatus as claimed in claim 5 wherein said moving means includes an endless chain having a plurality of pushers mounted thereon, said pushers being adapted to contact one surface of the packages to move the packages along said flow path.

7. Apparatus as claimed in claim 1 wherein said heating means includes a plurality of heaters disposed within the interior of said platen which convey heat to the cylindrical surface of said platen.

8. Apparatus as claimed in claim 7 wherein said platen is a cylindrical drum and further comprising a low-friction material formed on the cylindrical surface of said drum.

9. Apparatus as claimed in claim 8 wherein the curvature of said drum is designed essentially to match the concavity formed in the packages at the overlapped portions of the film wrapper upon contact with said drum, thereby to obtain substantially complete contact of said cylindrical surface of said drum with said wrapper at the overlapped portions.

10. Apparatus as claimed in claim 9 further comprising a drum shaft on which said drum is mounted, and a yoke assembly in which said shaft and thereby said drum are rotationally mounted.

11. Apparatus as claimed in claim 2 further comprising a second platen adjacent to and rotatable with said platen, said second platen having a substantially cylindrical surface which is designed to be contacted by said film wrapper at the overlapped portions subsequent to the formation of said heat-sealed seam, said second platen serving as a heat sink to cool and thereby set said heat-sealed seam.

12. Apparatus as claimed in claim 11 wherein the cylindrical surfaces of the two platens are concentric and have equal diameters so that said urging means urges packages into contact with the cylindrical surface of said second platen during their movement along said flow path.

* * * * *